United States Patent
Chen et al.

(10) Patent No.: US 11,010,211 B2
(45) Date of Patent: May 18, 2021

(54) CONTENT PROCESSING ACROSS APPLICATIONS

(71) Applicant: Microsoft Technology Licensing, LLC, Redmond, WA (US)

(72) Inventors: Xi Chen, Beijing (CN); Benjamin Sun, Beijing (CN); Long Ding, Beijing (CN); Xiaoli Liu, Beijing (CN); Huifang Ji, Beijing (CN); Katsumi Take, Redmond, WA (US); Yiannis Paniaras, Redmond, WA (US); Qu Mo, Beijing (CN); Sirui Zhou, Beijing (CN); Qi Zhao, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/349,522

(22) PCT Filed: Nov. 15, 2016

(86) PCT No.: PCT/CN2016/105959
§ 371 (c)(1),
(2) Date: May 13, 2019

(87) PCT Pub. No.: WO2018/090204
PCT Pub. Date: May 24, 2018

(65) Prior Publication Data
US 2019/0347144 A1   Nov. 14, 2019

(51) Int. Cl.
*G06F 9/54* (2006.01)
*G06F 3/0484* (2013.01)
*H04L 29/08* (2006.01)

(52) U.S. Cl.
CPC .......... *G06F 9/541* (2013.01); *G06F 3/04842* (2013.01); *H04L 67/2804* (2013.01); *H04L 67/2833* (2013.01); *H04L 67/30* (2013.01)

(58) Field of Classification Search
CPC .. G06F 9/541; G06F 3/04842; G06F 16/9535; H04L 67/30
(Continued)

(56) References Cited

U.S. PATENT DOCUMENTS

2008/0086700 A1   4/2008   Rodriguez et al.
2008/0098319 A1   4/2008   Lucas
(Continued)

FOREIGN PATENT DOCUMENTS

CN   104090762 A   10/2014
CN   105260207 A   1/2016
(Continued)

OTHER PUBLICATIONS

"Extended European Search Report Issued in European Patent Application No. 16921807.0", dated May 25, 2020, 10 Pages.
(Continued)

*Primary Examiner* — Wing F Chan
*Assistant Examiner* — Leon Y Tseng
(74) *Attorney, Agent, or Firm* — Arent Fox, LLP (57) ABSTRACT

In implementations of the subject matter described herein, a new approach for transferring content between applications is proposed. Generally speaking, in operation, a user can select an area on a user interface in order to cover content that the user wants to transfer. In response, the type of the content in the selected area will be identified. One or more options are then provided on the user interface based on the identified type, and each option may link to one or more applications. Upon a user's selection of an option, an application associated with the selected option is launched to process the content. In this way, the content can be effectively and efficiently processed across different applications, which will significantly improve the processing efficiency and user experience.

20 Claims, 5 Drawing Sheets

(58) Field of Classification Search
USPC .......................................................... 709/203
See application file for complete search history.

(56) References Cited

U.S. PATENT DOCUMENTS

| | | |
|---|---|---|
| 2013/0205219 A1 | 8/2013 | Moha et al. |
| 2015/0026642 A1 | 1/2015 | Falzone et al. |
| 2015/0287099 A1* | 10/2015 | Soundararajan .... G06F 16/9566 705/14.72 |
| 2016/0055246 A1 | 2/2016 | Marcin et al. |
| 2016/0364118 A1* | 12/2016 | Foerster ................. G06F 3/167 |

FOREIGN PATENT DOCUMENTS

| | | |
|---|---|---|
| EP | 2660731 A1 | 11/2013 |
| EP | 2701047 A1 | 2/2014 |
| WO | 2013122840 A1 | 8/2013 |
| WO | 2015094359 A1 | 6/2015 |

OTHER PUBLICATIONS

"International Search Report and Written Opinion Issued in PCT Application No. PCT/CN2016/105959", dated Jun. 30, 2017, 12 Pages.

* cited by examiner

Fig. 7

CONTENT PROCESSING ACROSS APPLICATIONS

CROSS-REFERENCE TO RELATED APPLICATION

This application is a 35 U.S.C. § 371 National Phase Application of PCT Application No. PCT/CN2016/105959 filed Nov. 15, 2016. The disclosure of this prior application is hereby incorporated by reference herein in their entirety.

BACKGROUND

An application is generally a computer program designed to perform a group of coordinated functions, tasks, or activities for the benefit of the user. Examples of an application include a word processor, a web browser, a chatting application, a media player, a photo editor, a map application, and so forth. Depending on the activity for which it was designed, the application can process texts, numbers, images, barcodes, videos, or a combination of these elements.

Generally, there are many applications installed on or otherwise associated with a device that execute independently from one another. These applications perform different programs, process different types of data, and generate different results accordingly. For example, a user may open an image editor and draw a picture in the image editor, and he/she saves the picture in the disk and closes the image editor. Next, the user needs to open an email application and emails this picture as an attachment in the email application. As such, the user completes the process of sharing a picture generated by the image editor in the email application. However, at present, it is hard for a user to perform operations across different applications.

SUMMARY

In accordance with implementations of the subject matter described herein, a new approach for transferring content between applications is proposed. Generally speaking, in operation, a user can select an area on a user interface in order to cover content that the user wants to transfer. In response, the type of the content in the selected area will be identified. One or more options are then provided on the user interface based on the identified type, and each option may link to one or more applications. Upon a user's selection of an option, an application(s) associated with the selected option is launched to process the content. In this way, the content can be effectively and efficiently processed across different applications, which will significantly improve the processing efficiency and user experience.

It is to be understood that the Summary is not intended to identify key or essential features of implementations of the subject matter described herein, nor is it intended to be used to limit the scope of the subject matter described herein. Other features of the subject matter described herein will become easily comprehensible through the description below.

BRIEF DESCRIPTION OF THE DRAWINGS

The details of one or more implementations of the subject matter described herein are set forth in the accompanying drawings and the description below. Other features, aspects, and advantages of the disclosure will become apparent from the description, the drawings, and the claims, wherein:

Throughout the figures, same or similar reference numbers will always indicate same or similar elements.

DETAILED DESCRIPTION

Principle of the subject matter described herein will now be described with reference to some example implementations. It is to be understood that these implementations are described only for the purpose of illustration and help those skilled in the art to understand and implement the subject matter described herein, without suggesting any limitations as to the scope of the disclosure. The disclosure described herein can be implemented in various manners other than the ones describe below.

As used herein, the term "comprise/include" and its variants are to be read as open terms that mean "comprise/include, but is not limited to". The term "based on" is to be read as "based at least in part on". The term "a" is to be read as "one or more" unless otherwise specified. The term "one implementation" and "an implementation" are to be read as "at least one implementation". The term "another implementation" is to be read as "at least one other implementation". Moreover, it is to be understood that in the context of the subject matter described herein, the terms "first", "second" and the like are used to indicate individual elements or components, without suggesting any limitation as to the order of these elements. Further, a first element may or may not be the same as a second element. Other definitions, explicit and implicit, may be included below.

Conventionally, different applications run independently, and as a result, it is inconvenient to transfer or share content between different applications. For example, when a user sees an address in an email application, if he/she wants to find out where the address is, the user has to launch a map application or launch a web browser to open a map service website and then input the address manually or copy the address from the clipboard. Likewise, the user often has to transfer content such as texts, numbers, images and barcodes across applications. This is inconvenient especially on a computing device with a small screen. As a result, the traditional methods and systems generally cannot transfer content between applications well.

According to implementations of the subject matter described herein, the content can be efficiently transferred and processed across different applications. To this end, the user is allowed to select an area covering the content he/she wants to process. The type of the content in the selected area is identified. Then, one or more options corresponding to the identified type are provided on the user interface, where each option can be selected to trigger processing of the content. For example, the selection of an option may launch an application and cause the content to be transferred to the application. In this way, the user no longer needs to switch among different applications manually, thereby significantly improving the efficiency of the content processing and the user experience. Some example implementations will now be described with respect to FIGS. 1-7.

Figure 1:
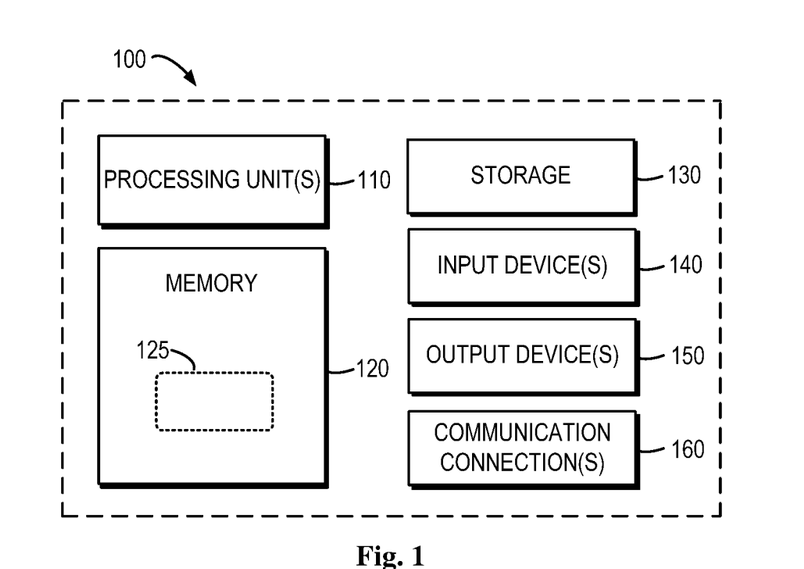
FIG. 1 is a block diagram of a device suitable for implementing one or more implementations of the subject matter described herein.

FIG. 1 is a block diagram of a device 100 suitable for implementing one or more implementations of the subject matter described herein. It is to be understood that the device 100 is not intended to suggest any limitation as to scope of use or functionality of the subject matter described herein, as various implementations may be implemented in diverse general-purpose or special-purpose computing environments. Examples of the device 100 include, but are not limited to, laptop computers, desktop computers, tablet computers, cellular phones, smartphones, tablet computers, personal digital assistants (PDAs), wearable watches, wearable glasses, or the like.

As shown, the device 100 includes at least one processing unit 110 and a memory 120. The processing unit 110 executes computer-executable instructions and may be a real or a virtual processor. In a multi-processing system, multiple processing units execute computer-executable instructions to increase processing power. The memory 120 may be volatile memory (such as registers, cache, RAM), non-volatile memory (such as ROM, EEPROM, flash memory), or some combination thereof.

In the example shown in FIG. 1, the device 100 further includes storage 130, one or more input devices 140, one or more output devices 150, and one or more communication connections 160. An interconnection mechanism (not shown) such as a bus, controller, or network interconnects the components of the device 100. Typically, the operating system software (not shown) provides an operating environment for other software executing in the device 100, and coordinates activities of the components of the device 100.

The storage 130 may be removable or non-removable, and may include computer-readable storage media such as flash drives, magnetic disks or any other medium which can be used to store information and which can be accessed within the device 100. The input device(s) 140 may be one or more of various different input devices. For example, the input device(s) 140 may include a user device such as a mouse, keyboard, trackball, and so on. The input device(s) 140 may implement one or more natural user interface techniques, such as speech recognition or touch and stylus recognition. As other examples, the input device(s) 140 may include a scanning device; a network adapter; or another device that provides input to the device 100. The output device(s) 150 may be a display, printer, speaker, network adapter, or another device that provides output from the device 100. The input device(s) 140 and output device(s) 150 may be incorporated in a single system or device, such as a touch screen or a virtual reality (VR) system.

The communication connection(s) 160 enables communication over a network. Additionally, functionality of the components of the device 100 may be implemented in a single computing machine or in multiple computing machines that are able to communicate over THE network. Examples of the network includes, but is not limited to, a wired or wireless network, such as a local area network ("LAN"), a metropolitan area network ("MAN"), a wide area network ("WAN") or the Internet, a communication network, a near field communication connection or any combination thereof. Thus, the device 100 may operate in a networked environment using logical connections to one or more other servers, network PCs, or another common network node. By way of example, and not limitation, the network is implemented via a communication media including wired or wireless networking techniques.

In accordance with implementations of the subject matter described herein, a module 125 may be executed on the device 100 to allow a user of the device 100 or another device to transfer content between different applications. For example, the module 125 may be a computer program or at least a part thereof. Specifically, in some implementations, the module 125 may be integrated as a tool in the operating system (OS) of the device 100.

When executed by the processing unit 160, at least a portion of the module 125 will be loaded into the memory 120. The other portion (if any) of the module 125 may be stored in the storage 130 or any other non-volatile storage medium. In operation, the module 125 may carry out one or more methods/processes according to implementations of the subject matter described herein.

Figure 2:
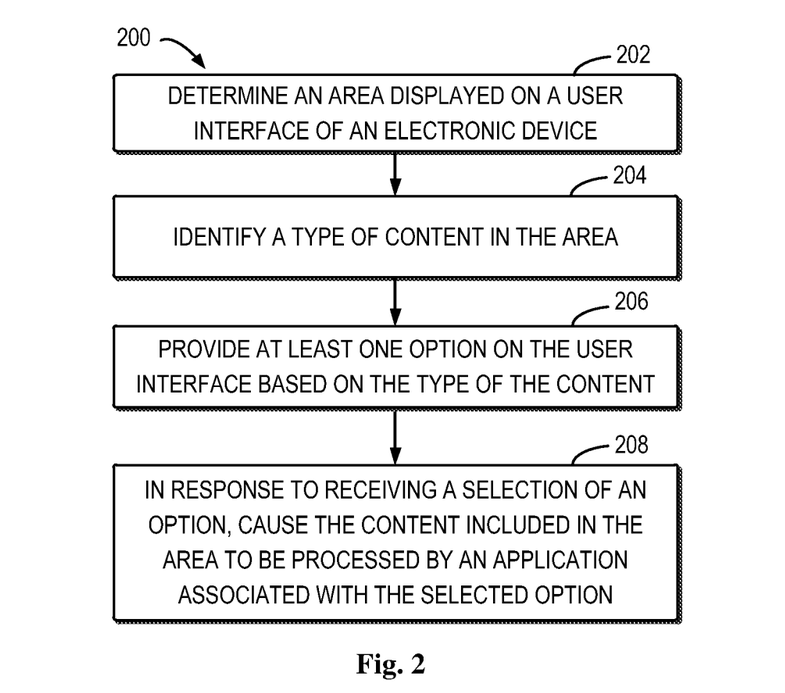
FIG. 2 is a flowchart illustrating a method for transferring content between applications in accordance with an example implementation of the subject matter described herein.

The functionality/operations of the module 125 will be described with reference to FIG. 2, which is a flowchart illustrating a method 200 for transferring content between applications in accordance with an example implementation of the subject matter described herein.

At 202, an area displayed on a user interface (UI) of the device 100. For example, in some implementations, the user interface may be the graphical user interface (GUI). The user can select a specific area on the UI in a variety of manners. For example, the user may specific the area by dragging a mouse, a finger(s) or a stylus on the UI to define the area to be selected. The area may be rectangle region, circular region, and any other regular region or irregular region. In some implementations, the area may be obtained from a screenshot of a portion of the UI, which will be described in detail below with reference to FIG. 3A.

At 204, a type of the content included in the area is identified. The type of the content may be generally classified as text, image and video. In some implementations, the text may further classified as plaintext and operable text. Examples of operable text include, but are not limited to, telephone number, fax number, address and the like. Alternatively, or in addition, the type of images can be further divided into non-operable and operable images. Examples of the operable images include, but are not limited to, barcode image, QR code image, and the like. It is to be understood that the above types are only examples without suggesting any limitations as to the scope of the subject matter described herein. The implementations are applied to any other content types as well.

In general, the type of the content is determined by content recognition technology. For example, the optical character recognition (OCR) may be applied on the selected area. If all of the content in the area are recognized as characters, the type of content will be determined as text. Any suitable recognition technology, either currently known or to be developed in future, can be applied to identify the type of the content in a specific area on the GUI.

In some implementations, a default type of the content is preset. By way of example, the default type may be an image. That is, if it is hard or unable to exactly identify the specific type of the content in the selected area, the content in the area will be regarded as a default type. In some implementations, only one type is identified from the content. In other cases, the selected area may have various types of content. At this point, it is possible to identify two or more types of the content from the area, or determine a single type of the "dominant" content in the area. Examples will be described in details below with reference to FIGS. 6A and 6B.

In some implementations, the type of content may be identified based on prediction of the user's intention. That is, the module 125 predicts what the user wants to do and/or can do and identifies the content type accordingly. In some implementations, for example, the interaction context can be used to predict the user's intension. As used herein, the phrase "context" refers to the properties that can characterize the user's interaction with a device. For example, the interaction context may include one or more previous actions performed by the user on the device 100, a profile of the user, a profile of the device 100, and/or a profile of an environment in which the user is located.

The profile of the user may indicate information on the user such as knowledge of habits, emotional state, biophysiological conditions, and the user's social environment such as co-location of others, social interaction, group dynamics, and the user's tasks such as spontaneous activity, engaged tasks, general goals. The profile of the device 100 may indicate one or more properties of the device such as network capability, storage size, processing capability. Likewise, the profile of the environment describes physical environment such location, infrastructure such surrounding resources for computation, communication, task performance, and physical conditions such noise, light, pressure, air quality.

The interaction context can be sensed in any suitable manners, either currently known or to be developed in future. Then the context is taken into consideration when identifying the content type in the area selected by the user. For example, after the user selects an area in the UI of a web browser, the module 125 may determine whether the device 100 is connected to the network. If so, the module 125 may attempt to recognize any email address in the selected area. Otherwise, the module 125 only recognize the text (if any) in the area as plaintext.

At 206, one or more options are provided on the user interface based on the type of the content. Each option is available for user's selection and is associated with an application that is suitable to process the identified type of content. For example, if the content in the selected area is identified as an image, the options associated with the applications capable of processing images, such as one or more image editors, email applications and the like, may be presented.

In some implementations, for example, the one or more options may be presented as menus or application icons on the GUI, and each menu may link to one or more applications suitable for processing the content of the identified type. In some implementations, options associated with different applications may have different appearances such as shapes, colors, patterns, sizes, and so on.

In the case that there are a plurality of options to be provided, the options can be ranked, for example, based on the predicted intention of the user. Example implementations of the presentation and operation of the options will be discussed in the following paragraphs. Alternatively, or in addition, in some implementations, the plurality of options may be ranked based on relevance between the plurality of options and the type of the content, which will be described in details below with reference to FIG. 4B.

Some applications associated with the presented options can be installed and executable on the device 100. Alternatively, one or more options may be associated with remote applications accessible to the device 100, for example, via network. That is, the content may be automatically transferred to an associated application in a remote device. Upon the user's selection, the associated application may be launched and the content can be automatically passed to the application for processing.

In some implementations, the applications may be determined according to a default setting. That is, for each content type, the device 100 records one or more application suitable for processing that type of content. The default setting may be stored in the storage 130, for example.

At 208, in response to receiving a selection of one of the options is received, the device 100 causes the content included in the area to be processed by the application associated with the selected option. For example, the device 100 may launch or activate the application and transfer the content to the application for processing. The content can be transferred in any suitable manners including, but not limited to, inter-thread communication, inter-process communication, inter-application communications, network communications, near field communication, or the like.

Specifically, the application that is launched to process the content is different from the application that renders the UI and the content. For example, in some implementations, the UI and content are rendered in a web browser application, while the application triggered by the selection of an option may be a word processing application separated from the web browser. That is, the content is transferred among different applications.

Considering an example, it is assumed that the content included in the selected area in the UI is identified as an email address. Traditionally, if a user wants to send an email to that the address, the user has to select the address, copy it to the clipboard, switch to the email application, create a new email, and paste the copied address from the clipboard into a receipt field of the new email. Instead of such tedious process, according to implementations of the subject matter described herein, after the selecting an area on the UI, the device 100 identifies that the content in the selected area contains an email address. In response, an option associated with the email application will be presented, for example, alongside the area. The user can trigger the email application by simply selecting, for example, clicking on that option. Then the email application will be activated to create a new email, with the email address automatically filled into the receipt field.

It is to be understood that, although a plurality of options may be provided, only one option may be also possible. In this case, the one option that is provided may not be presented on the GUI, and the one option will be selected automatically without any user action. In other word, once the user selects the area, the content included in the area is automatically transferred to another application based on the type of the content. In some implementations, if a score of an option is higher than a threshold, the option may be selected without any user selection. In some implementations, some functions may be provided, for example, the selected content is always translated into texts, or the selected content is always transferred to a word processing application.

In some implementations, if the content is a non-operable content such as a non-operable image, the content to be transferred may be the image per se. Additionally, if the content is an operable content such as a text or a barcode, the text or the barcode may be extracted from the content; and then the extracted text or barcode may be transferred to the selected application for processing.

Likewise, the text, barcode, media such as video clips and so on can be provided to suitable applications for subsequent processing. In some implementations, the content per se is transferred. Alternatively, in other implementations, a Uniform Resource Identifier (URI) may be provided such that the target application can retrieve the content.

In this way, processing of the content in the selected area can be efficiently initiated. The user only needs to select an option associated with the operation he/she wants to perform on the content. As a result, the user is liberated from switching among different applications.

Figure 3A:
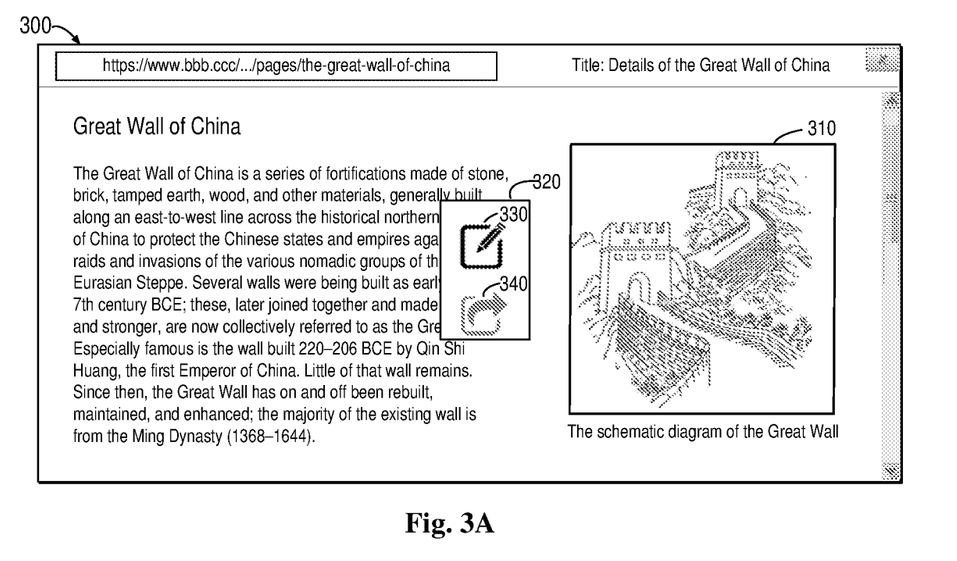
FIGS. 3A and 3B illustrate example graphical user interfaces (GUIs) for transferring an image and a piece of text between applications on a desktop computing device in accordance with an example implementation of the subject matter described herein.
Figure 3B:
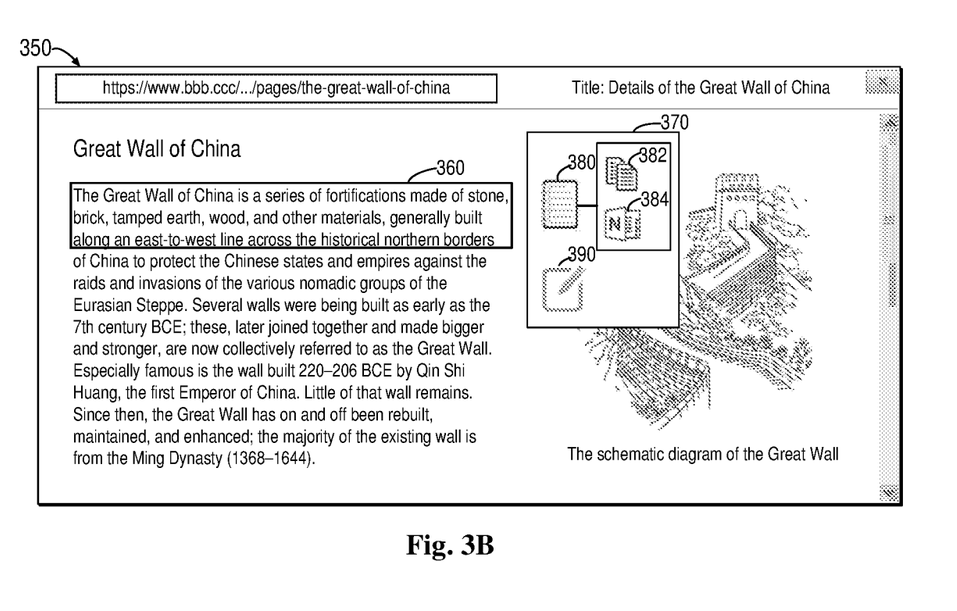

Now some example implementations of the method 300 as described above will be described. FIGS. 3A and 3B illustrate example GUIs 300 and 350 for transferring an image and a piece of text between applications on a desktop computing device in accordance with an example implementation of the subject matter described herein. It is to be understood that the GUIs in FIGS. 3A-3B may be displayed on a display in the device 110 in FIG. 1. These example GUIs are illustrated only for the purpose of illustration and help those skilled in the art to understand and implement the subject matter described herein, without suggesting any limitations as to the scope of the subject matter described herein.

In the GUI 300 as shown in FIG. 3A, the user is browsing a webpage, which is an introduction of the Great Wall of China, with a web browser in the desktop computing device. It is assumed that the user is interested in the image of the Great Wall in the GUI 300 and wants to save or share the image, and thus the user selects an area 310 on the GUI 300. As illustrated in the FIG. 3A, the area 310 covers the image of the Great Wall.

In some implementations, the user may take a screenshot of at least a portion of the GUI 310, and the user then may select the area 310 by drawing a regular or irregular shape. For example, the user then may adjust the size of the screenshot to cover the content to be transferred, and the adjusted screenshot will be processed as the area 310. In this way, the user is enabled to select a proper area such that the content he/she wants to process can be included in the proper area. It is to be understood that though the screenshot is provided as an example, other area selection approaches are possible as well.

In some implementations, the screenshot may be taken in any suitable ways. For example, a floating window may be provided on the UI and the user may initiate the screenshot by clicking on the menu item on the floating window. Alternatively, the user may tap a specific key(s) to invoke the screenshot. In another implementation, the user may speak a specific voice command, for example, through a speaker of the device 100 so as to take the screenshot.

Upon determination of the area 310 on the GUI 300, the device 100 (more specifically, the module 125) recognizes the content in the 310 such as through OCR technology in order to determine the type of the content. In this case, the content in the area 310 is an image of the Great Wall, and thus a window 320 is rendered with includes options associated with applications suitable for processing the image. In this example, the window 320 is displayed proximity to the area 310 to facilitate the user's selection.

As shown in FIG. 3A, the window 320 includes an option 330 associated with an image editor and an option 340 indicating that the image in the area 310 may be transferred to another application, such as to share with others. It is to be understood that though the icons are provided as the representations of the options, other types of options such as text menus may be also possible. In some implementations, if the user selects the option 340, some new sub-option(s) for image processing may be presented for the user selection.

In the GUI 350 as shown in FIG. 3B, it is assumed that the user selects an area 360 on the GUI 350. By means of OCR technology, for example, the content in the area 360 are identified as texts, that is, "The Great Wall of China is a series of fortifications made of stone, brick, tamped earth, wood, and other materials, generally built along an east-to-west line across the historical northern borders". In response, a window 370 is displayed with a plurality of options corresponding to text processing. As shown in FIG. 3B, the window 370 includes an option 380 indicating that the content in the area 360 may processed as text and an option 390 associated with an image editor. In this example, the option 380 further includes a sub-option 382 indicating that the text may be copied to the clipboard and a sub-option 384 that the text may be sent to a word processing application for processing.

For example, if the user selects the sub-option 384, the texts will be directly entered into the word processing application without requiring the user to manually copy and paste. That is, the selected text can be automatically passed from one application (web browser) to another (word processing application), without user's manual operations. Such content transfer across applications reduces the operations the user has to do.

Figure 4A:
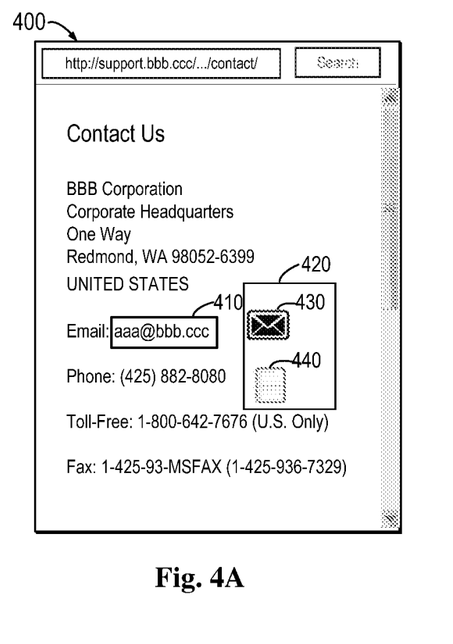
FIGS. 4A and 4B illustrate example GUIs for transferring an email address and a telephone number between applications on a mobile computing device in accordance with an example implementation of the subject matter described herein.
Figure 4B:
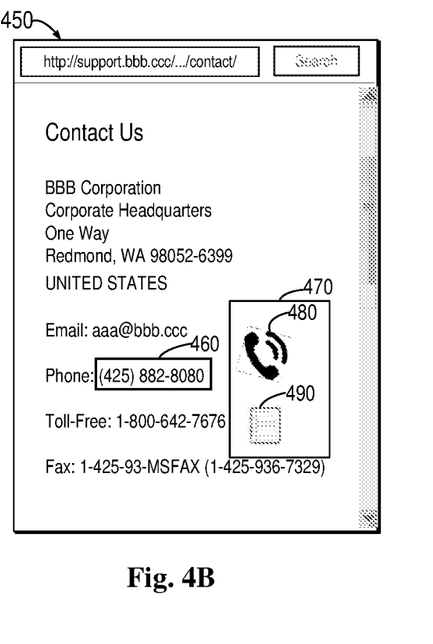

As another example, FIGS. 4A and 4B example GUIs 400 and 450 in relation to an email address and a telephone number which are two kinds of special text content. In the GUI 400 as shown in FIG. 4A, the user is browsing a webpage. Assuming that the user selects an area 410, the content within this area 410 is recognized as text. More particularly, the device 100 can recognize that the text in area 410 is operable text, namely, an email address "aaa@bbb.ccc". Then, a window 420 that includes options suitable for the email address are presented. In this case, the window 420 includes an option 430 indicating that an email application may be launched to send an email to this email address and an option 440 indicating that this email address may be stored in the text application. If the user selects the option 430, the email application will be activated to create a new email, with the email address "aaa@bbb.ccc" automatically filled into the receipt field. As such, the user can directly start editing the email body.

In some implementations, if a plurality of options are determined for processing the content included in the area, the plurality of options may be ranked. The ranking can be done based on relevance between the plurality of options and the type of the content. Alternatively, or in addition, the interaction context can be taken into account in ranking the options. An example will now be described with reference to FIG. 4B.

As shown in the GUI 450 of FIG. 4B, the user selects an area 460 and content in the area 460 is recognized as text. Assuming that the device 100 is a mobile device with the capability of telephone communication, a further recognition may be applied to identify that the text contains a telephone number. At this point, the telephone application is considered to be more relevant than a text editor application. As a result, in the displayed window 470, the option 480 associated with the telephone application is ranked higher than the option 490 associated with the text editor. As such, the user can easily select the option 480 to invoke telephone application to dial the number. On the other hand, if the interaction context shows that the user frequently edit text content in the editor application, the option 490 may be displayed prior to the option 480 depict that the text is identified as a telephone number.

As another example, it is assumed the content in the selected area is identified as an image and it is sensed that the user enjoys sharing images with others. In this example, upon the user's selection of the area, it can be predicted that the user probably wants to send the image in a chatting application and/or an email application. These applications can be then ranked relatively high. In this way, the intelligence of user interaction can be further enhanced.

Figure 5:
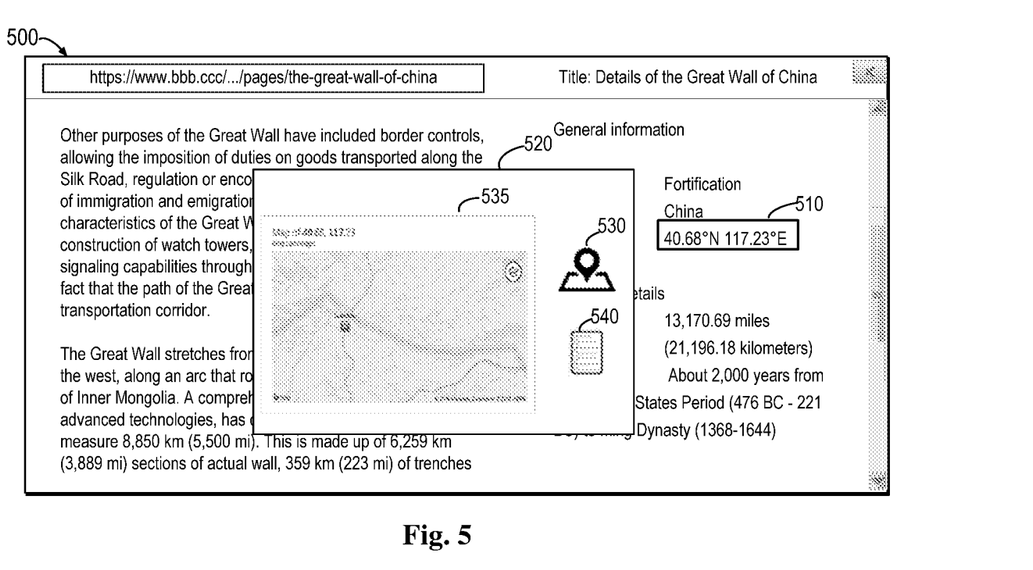
FIG. 5 illustrates example GUI for transferring a geographical coordinate between applications in accordance with an example implementation of the subject matter described herein.

FIG. 5 illustrates another example GUI 500 for transferring a geographical coordinate between applications in accordance with an example implementation of the subject matter described herein. In the GUI 500, the user selects an area 510 that includes a geographic coordinate of the Great Wall of China, that is, 40.68° N 117.23° E, and content in the area 510 is generally recognized as texts. Through a further recognition, the texts represent a geographic coordinate, and thus the type of the content in the area 510 can be determined as a real-world address. Then, the window 520 includes an option 530 associated with a map application. By selecting the option 530, the map application may be invoked to search for the address 40.68° N 117.23° E and shows the result on a map, for example. The focus can be switched to the map application. Or, alternatively, a map window 535 may be embedded into the window 520 without jumping to the map application. The window 520 further includes an option 540 associated with a text editor.

In some implementations, more than one type of content is included in the selected area. At this point, in some implementations, the type of the "dominate" content in the area will be identified as the content type of the whole area. For example, if a first type of first content and a different second type of second content are identified in the area, a size of the first content and a size of the second content are compared. If the size of the first content is greater than the size of the second content, the first type of the first content may be determined as the type of the content, and vice versa. In other words, the type of content occupying a higher proportion of the area will be regarded as the main content in the area.

Specifically, in some implementations, the first type of the first content is determined as the type of the content in the area only if a ratio between the size of the first content and the size of the area is greater than a predetermined threshold. That is, the size of the first type of content is large enough in the selected area.

Figure 6A:
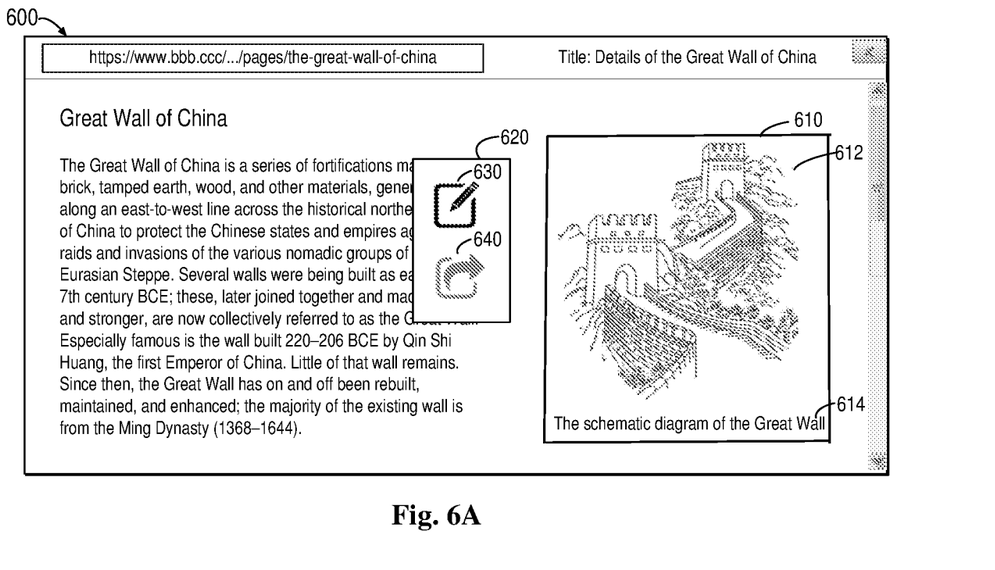
FIGS. 6A and 6B illustrates example GUI for transferring several types of content between applications in accordance with an example implementation of the subject matter described herein.

FIG. 6A shows such an example implementation. In the GUI 600, the user selects an area 610 that includes both an image area 612 and a text area 614. Since the image area 612 occupies the majority of the area 610, the type of the content in the area 610 will be identified as an image. Thus, a window 620 that includes options corresponding to the image is presented. As shown in FIG. 6A, the window 620 includes an option 630 associated with an image editor and an option 640 indicating that the image of the screenshot of the area 610 may be transferred to another application. That is, only the applications associated with the determined type is provided.

Figure 6B:
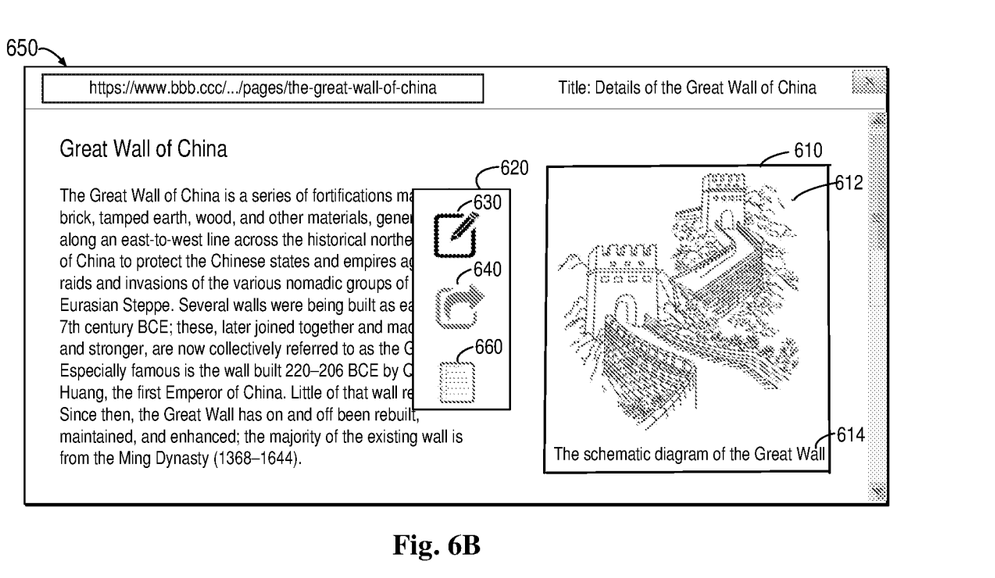

Alternatively, in other implementations, it is possible to identify all the content types in the area and provide options for processing these types of content. For instance, in the above example, it can be seen that the selected area 610 indeed includes text such as "The schematic diagram of Great Wall". Instead of discarding such content as discussed with reference to FIG. 6A, in the implementation as shown in FIG. 6B, the window 620 further includes an option 660 associated with a text application in addition to the options 630 and 640.

Figure 7:
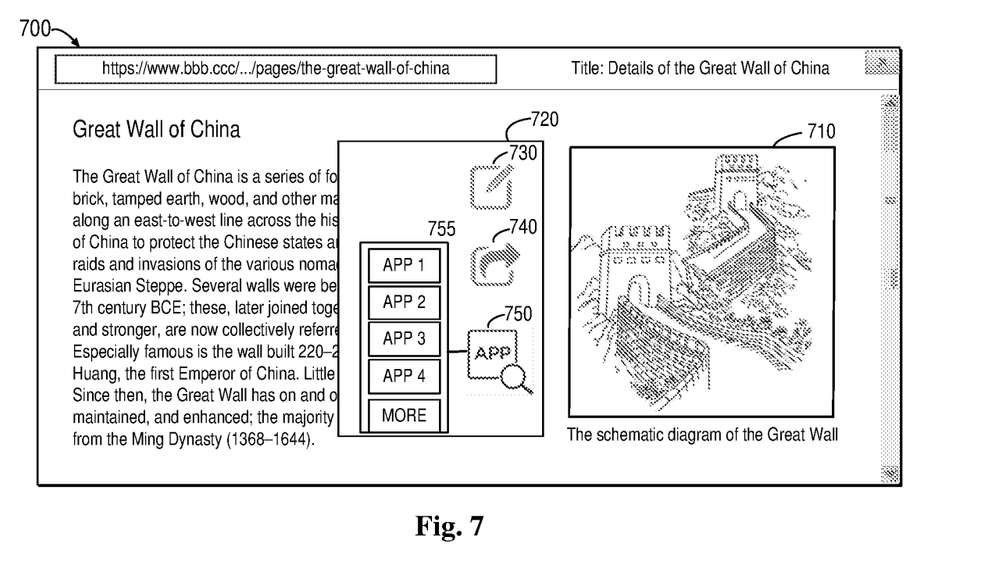
FIG. 7 illustrates example GUI for transferring content between one application and another application specified by the user in accordance with an example implementation of the subject matter described herein.

In some implementations, one option may be associated with two or more applications suitable for processing the identified type of content. An example implementation is shown in FIG. 7. Specifically, in the GUI 700 as shown in FIG. 7, the user selects an area 710 that includes an image of the Great Wall of China. Then, a window 720 that includes options corresponding to the image is presented. Specifically, the window 720 includes an option 730 associated with an image editor, an option 740 for transferring the screenshot of the area 710 to another application, and an option 750 from which a plurality of application installed on or accessible to the device 100 may be searched.

If the user selects the option 750, for example, representations of the plurality of applications are presented on the window 720 as the sub-options "APP 1", "APP 2" and the like. Additionally, the user may select the sub-option "MORE" to view all the suitable applications. The user may select an application from the plurality of application for processing the content. In this way, if the recommended applications are not expected by the user, the user may manually select the application his/her want to use. In some implementations, the selected application may be recommended in future when the user selects the same or similar type of content.

For the purpose of illustrating spirit and principle of the subject matter described herein, some specific implementations thereof have been described above. By identifying the type of the content to be transferred between applications, the application(s) suitable for the content may be provided for user selection. In this way, the content can be effectively and efficiently processed across different applications, which will significantly improve the processing efficiency and user experience.

Now only for the purpose of illustration, some example implementations will be listed below.

In some implementations, the subject matter described herein may be embodied as a device. The device comprises a processing unit and a memory. The memory is coupled to the processing unit and stores instructions for execution by the processing unit. The instructions, when executed by the processing unit, cause the device to perform acts including: determining an area displayed on a user interface of an device; identifying a type of content included in the area; providing at least one option on the user interface based on the type of the content, each of the at least one option is associated with an application suitable for processing the identified type of content; and in response to receiving a selection of one of the at least one option, causing the content included in the area to be processed by the application associated with the selected option.

In some implementations, the acts further comprise: obtaining an interaction context of the user, the interaction context indicating at least one of: at least one previous action performed by the user on the device, a profile of the user, a profile of the device, and a profile of an environment in which the user is located; and predicting an intention of the user at least in part based on the interaction context, the intention to be used in at least one of the following: the identifying a type of content, or the providing at least one option.

In some implementations, the identifying a type of content included in the area comprises: in response to determining that a first type of first content and a different second type of second content are included in the area, comparing a size of the first content and a size of the second content; in response to the size of the first content being above the size of the second content, determining the first type of the first content as the type of the content; and in response to the size of the first content being below the size of the second content, determining the second type of the first content as the type of the content.

In some implementations, the providing at least one option on the user interface comprises: determining a plurality of options for processing the content included in the area; ranking the plurality of options based on relevance between the plurality of options and the type of the content; and displaying the plurality of options according to the ranking.

In some implementations, the causing the content included in the area to be processed by the application comprises: in response to receiving a first selection of the option from the at least one option, providing representations of a plurality of applications associated with the selected option; and in response to receiving a second selection of the application from the plurality of applications, causing the selected application to process the content.

In some implementations, the causing the content included in the area to be processed by the application comprises: extracting a text or a barcode from the content; and providing the extracted text or barcode to the selected application for processing.

In some implementations, the determining an area displayed on a user interface comprises: obtaining a screenshot of at least a portion of the user interface; and determining the area from the screenshot.

In some implementations, the determining the area from the screenshot comprises: presenting the screenshot on the user interface; receiving a user input that adjusts a size of the screenshot; and determining the area from the adjusted screenshot.

Alternatively, or in addition, the subject matter described herein may be embodied as a computer-implemented method. The method comprises: determining an area displayed on a user interface of an device; identifying a type of content included in the area; providing at least one option on the user interface based on the type of the content, each of the at least one option is associated with an application suitable for processing the identified type of content; and in response to receiving a selection of one of the at least one option, causing the content included in the area to be processed by the application associated with the selected option.

In some implementations, the acts further comprise: obtaining an interaction context of the user, the interaction context indicating at least one of: at least one previous action performed by the user on the device, a profile of the user, a profile of the device, and a profile of an environment in which the user is located; and predicting an intention of the user at least in part based on the interaction context, the intention to be used in at least one of the following: the identifying a type of content, or the providing at least one option.

In some implementations, the identifying a type of content included in the area comprises: in response to determining that a first type of first content and a different second type of second content are included in the area, comparing a size of the first content and a size of the second content; in response to the size of the first content being above the size of the second content, determining the first type of the first content as the type of the content; and in response to the size of the first content being below the size of the second content, determining the second type of the first content as the type of the content.

In some implementations, the providing at least one option on the user interface comprises: determining a plurality of options for processing the content included in the area; ranking the plurality of options based on relevance between the plurality of options and the type of the content; and displaying the plurality of options according to the ranking.

In some implementations, the causing the content included in the area to be processed by the application comprises: in response to receiving a first selection of the option from the at least one option, providing representations of a plurality of applications associated with the selected option; and in response to receiving a second selection of the application from the plurality of applications, causing the selected application to process the content.

In some implementations, the causing the content included in the area to be processed by the application comprises: extracting a text or a barcode from the content; and providing the extracted text or barcode to the selected application for processing.

In some implementations, the determining an area displayed on a user interface comprises: obtaining a screenshot of at least a portion of the user interface; and determining the area from the screenshot.

In some implementations, the determining the area from the screenshot comprises: presenting the screenshot on the user interface; receiving a user input that adjusts a size of the screenshot; and determining the area from the adjusted screenshot.

Alternatively, or in addition, the subject matter described herein may be embodied as a computer-readable storage medium comprising instructions. The instructions, when executed by a processor, cause the process to perform acts comprising: determining an area displayed on a user interface of an device; identifying a type of content included in the area; providing at least one option on the user interface based on the type of the content, each of the at least one option is associated with an application suitable for processing the identified type of content; and in response to receiving a selection of one of the at least one option, causing the content included in the area to be processed by the application associated with the selected option.

In some implementations, the acts further comprise: obtaining an interaction context of the user, the interaction context indicating at least one of: at least one previous action performed by the user on the device, a profile of the user, a profile of the device, and a profile of an environment in which the user is located; and predicting an intention of the user at least in part based on the interaction context, the intention to be used in at least one of the following: the identifying a type of content, or the providing at least one option.

In some implementations, the identifying a type of content included in the area comprises: in response to determining that a first type of first content and a different second type of second content are included in the area, comparing a size of the first content and a size of the second content; in response to the size of the first content being above the size of the second content, determining the first type of the first content as the type of the content; and in response to the size of the first content being below the size of the second content, determining the second type of the first content as the type of the content.

In some implementations, the providing at least one option on the user interface comprises: determining a plurality of options for processing the content included in the area; ranking the plurality of options based on relevance between the plurality of options and the type of the content; and displaying the plurality of options according to the ranking.

In some implementations, the causing the content included in the area to be processed by the application comprises: in response to receiving a first selection of the option from the at least one option, providing representations of a plurality of applications associated with the selected option; and in response to receiving a second selection of the application from the plurality of applications, causing the selected application to process the content.

In some implementations, the causing the content included in the area to be processed by the application comprises: extracting a text or a barcode from the content; and providing the extracted text or barcode to the selected application for processing.

In some implementations, the determining an area displayed on a user interface comprises: obtaining a screenshot of at least a portion of the user interface; and determining the area from the screenshot.

In some implementations, In some implementations, the determining the area from the screenshot comprises: presenting the screenshot on the user interface; receiving a user input that adjusts a size of the screenshot; and determining the area from the adjusted screenshot.

Implementations of the subject matter described herein may further include one or more computer program products being tangibly stored on a non-transient machine-readable medium and comprising machine-executable instructions. The instructions, when executed on a device, causing the device to carry out one or more processes as described above.

In general, the various example implementations may be implemented in hardware or special purpose circuits, software, logic or any combination thereof. Some aspects may be implemented in hardware, while other aspects may be implemented in firmware or software which may be executed by a controller, microprocessor or other computing device. While various aspects of the example implementations of the subject matter described herein are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

In the context of the subject matter described herein, a machine readable medium may be any tangible medium that can contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Computer program code for carrying out methods of the subject matter described herein may be written in any combination of one or more programming languages. These computer program codes may be provided to a processor of a general purpose computer, special purpose computer, or other programmable data processing apparatus, such that the program codes, when executed by the processor of the computer or other programmable data processing apparatus, cause the functions or operations specified in the flowcharts and/or block diagrams to be implemented. The program code may execute entirely on a computer, partly on the computer, as a stand-alone software package, partly on the computer and partly on a remote computer or entirely on the remote computer or server.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of any disclosure or of what may be claimed, but rather as descriptions of features that may be specific to particular implementations of particular disclosures. Certain features that are described in this specification in the context of separate implementations can also be implemented in combination in a single implementation. Conversely, various features that are described in the context of a single implementation can also be implemented in multiple implementations separately or in any suitable sub-combination.

Various modifications, adaptations to the foregoing example implementations of this disclosure may become apparent to those skilled in the relevant arts in view of the foregoing description, when read in conjunction with the accompanying drawings. Any and all modifications will still fall within the scope of the non-limiting and example implementations of this disclosure. Furthermore, other implementations of the disclosures set forth herein will come to mind to one skilled in the art to which these implementations of the disclosure pertain having the benefit of the teachings presented in the foregoing descriptions and the drawings.

Therefore, it will be appreciated that the implementations of the disclosure are not to be limited to the specific implementations disclosed and that modifications and other implementations are intended to be included within the scope of the appended claims. Although specific terms are used herein, they are used in a generic and descriptive sense only and not for purposes of limitation.

What is claimed is:

1. A device comprising:
   a processing unit; and a memory coupled to the processing unit and storing instructions for execution by the processing unit, the instructions, when executed by the processing unit, causing the device to:
determine an area displayed on a user interface of the device;
identify a type of content included in the area;
provide at least one option on the user interface based on the type of the content, each of the at least one option being associated with an application suitable for processing the identified type of content;
determine a rank score for each of the at least one option;
compare each rank score to a threshold score; and
in response to a first rank score of a first option being higher than the threshold score:
select the first option of the at least one option without user input; and
cause the content included in the area to be processed by the application associated with the first option; or
in response to each rank score being lower than the threshold score:
receive a user selection selecting a second option of the at least one option; and
cause the content included in the area to be processed by the application associated with the second option.

2. The device of claim 1, wherein the memory further comprises instructions that cause the device to:
obtain an interaction context of a user, the interaction context indicating at least one of:
at least one previous action performed by the user on the device,
a profile of the user,
a profile of the device, and
a profile of an environment in which the user is located; and
predict an intention of the user at least in part based on the interaction context, the intention to be used in at least one of the identifying a type of content or the providing at least one option.

3. The device of claim 1, wherein the identifying a type of content included in the area comprises:
in response to determining that a first type of first content and a different second type of second content are included in the area, comparing a size of the first content and a size of the second content;
in response to the size of the first content exceeding the size of the second content, determining the first type of the first content as the type of the content; and
in response to the size of the first content being below the size of the second content, determining the second type of the first content as the type of the content.

4. The device of claim 1, wherein the providing at least one option on the user interface comprises:
determining a plurality of options for processing the content included in the area;
ranking the plurality of options at least based on relevance between the plurality of options and the type of the content; and
displaying the plurality of options according to the ranking.

5. The device of claim 1, wherein the causing the content included in the area to be processed by the application comprises:

in response to receiving a first selection of the second option from the at least one option, providing representations of a plurality of applications associated with the selected second option; and
in response to receiving a second selection of the application from the plurality of applications, causing the selected application to process the content.

6. The device of claim 5, wherein the causing the content included in the area to be processed by the application further comprises:
extracting a text or a barcode from the content; and
providing the extracted text or barcode to the selected application for processing.

7. The device of claim 1, wherein the determining an area displayed on a user interface comprises:
obtaining a screenshot of at least a portion of the user interface; and
determining the area from the screenshot.

8. The device of claim 7, wherein the determining the area from the screenshot comprises:
presenting the screenshot on the user interface;
receiving a user input that adjusts a size of the screenshot; and
determining the area from the adjusted screenshot.

9. A method comprising:
determining an area displayed on a user interface of a device;
identifying a type of content included in the area;
providing at least one option on the user interface based on the type of the content, each of the at least one option being associated with an application suitable for processing the identified type of content;
determining a rank score for each of the at least one option;
comparing each rank score to a threshold score; and
in response to a first rank score of a first option being higher than the threshold score:
selecting the first option of the at least one option without user input; and
causing the content included in the area to be processed by the application associated with the first option; or
in response to each rank score being lower than the threshold score:
receiving a user selection selecting a second option of the at least one option; and
causing the content included in the area to be processed by the application associated with the second option.

10. The method of claim 9, further comprising:
obtaining an interaction context of a user, the interaction context indicating at least one of:
at least one previous action performed by the user on the device,
a profile of the user,
a profile of the device, and
a profile of an environment in which the user is located; and
predicting an intention of the user at least in part based on the interaction context, the intention to be used in at least one the identifying a type of content or the providing at least one option.

11. The method of claim 9, wherein the identifying a type of content included in the area comprises:
in response to determining that a first type of first content and a different second type of second content are included in the area, comparing a size of the first content and a size of the second content;

in response to the size of the first content exceeding the size of the second content, determining the first type of the first content as the type of the content; and in response to the size of the first content being below the size of the second content, determining the second type of the first content as the type of the content.

12. The method of claim 9, wherein the providing at least one option on the user interface comprises:

determining a plurality of options for processing the content included in the area;

ranking the plurality of options at least based on relevance between the plurality of options and the type of the content; and displaying the plurality of options according to the ranking.

13. The method of claim 9, wherein the causing the content included in the area to be processed by the application comprises:

in response to receiving a first selection of the second option from the at least one option, providing representations of a plurality of applications associated with the selected second option; and in response to receiving a second selection of the application from the plurality of applications, causing the selected application to process the content.

14. The method of claim 13, wherein the causing the content included in the area to be processed by the application further comprises:

extracting a text or a barcode from the content; and providing the extracted text or barcode to the selected application for processing.

15. The method of claim 9, wherein the determining an area displayed on a user interface comprises:

obtaining a screenshot of at least a portion of the user interface; and determining the area from the screenshot.

16. The method of claim 15, wherein the determining the area from the screenshot comprises:

presenting the screenshot on the user interface;

receiving a user input that adjusts a size of the screenshot; and determining the area from the adjusted screenshot.

17. A non-transitory computer-readable storage medium comprising instructions that, when executed by a processor, cause the process to:

determine an area displayed on a user interface of an device;

identify a type of content included in the area;

provide at least one option on the user interface based on the type of the content, each of the at least one option being associated with an application suitable for processing the identified type of content;

determine a rank score for each of the at least one option;

compare each rank score to a threshold score; and in response to a first rank score of a first option being higher than the threshold score:

select the first option of the at least one option without user input; and cause the content included in the area to be processed by the application associated with the first option; or in response to each rank score being lower than the threshold score:

receive a user selection selecting a second option of the at least one option; and cause the content included in the area to be processed by the application associated with the second option.

18. The non-transitory computer-readable storage medium of claim 17, further comprising:

obtaining an interaction context of a user, the interaction context indicating at least one of:

at least one previous action performed by the user on the device, a profile of the user, a profile of the device, and a profile of an environment in which the user is located; and predicting an intention of the user at least in part based on the interaction context, the intention to be used in at least the identifying a type of content or the providing at least one option.

19. The non-transitory computer-readable storage medium of claim 17, wherein the identifying a type of content included in the area comprises:

in response to determining that a first type of first content and a different second type of second content are included in the area, comparing a size of the first content and a size of the second content;

in response to the size of the first content being above the size of the second content, determining the first type of the first content as the type of the content; and in response to the size of the first content being below the size of the second content, determining the second type of the first content as the type of the content.

20. The non-transitory computer-readable storage medium of claim 17, wherein the causing the content included in the area to be processed by the application comprises:

in response to receiving a first selection of the second option from the at least one option, providing representations of a plurality of applications associated with the selected second option; and in response to receiving a second selection of the application from the plurality of applications, causing the selected application to process the content.

* * * * *